Sept. 15, 1959 W. S. FINKEN ET AL 2,903,700

EYE SHIELD

Filed Jan. 28, 1954 4 Sheets-Sheet 1

INVENTORS
WALTER S. FINKEN
JACKSON A. AILEO
BY Robert A. Dunham
ATTORNEY

EYE SHIELD

Filed Jan. 28, 1954 4 Sheets-Sheet 2

INVENTORS
WALTER S. FINKEN
JACKSON A. AILEO
BY
Robert S. Dunham
ATTORNEY

Sept. 15, 1959 W. S. FINKEN ET AL 2,903,700

EYE SHIELD

Filed Jan. 28, 1954 4 Sheets-Sheet 3

INVENTORS
WALTER S. FINKEN
JACKSON A. AILEO
BY Robert A. Dunham
ATTORNEY

Sept. 15, 1959 W. S. FINKEN ET AL 2,903,700

EYE SHIELD

Filed Jan. 28, 1954 4 Sheets-Sheet 4

INVENTORS
WALTER S. FINKEN
JACKSON A. AILEO
BY Robert S. Dunham
ATTORNEY

United States Patent Office 2,903,700 Patented Sept. 15, 1959

2,903,700

EYE SHIELD

Walter S. Finken, Brooklyn, N.Y., and Jackson A. Aileo, Carbondale, Pa., assignors to Leonard P. Frieder, Great Neck, N.Y.

Application January 28, 1954, Serial No. 406,670

6 Claims. (Cl. 2—10)

This invention relates to a shield structure for protecting the eyes, and particularly to a shield structure to be worn with and supported on a safety helmet.

The particular shield structure disclosed herein is intended for use with a safety helmet of the type described in the copending application of Leonard P. Frieder and Walter S. Finken, now issued United States Patent No. 2,739,309 of March 27, 1956, entitled, "Headgear Structure."

Safety helmets of the type mentioned above are worn by people engaged in hazardous occupations, for example, aircraft pilots. In many cases, the occupation of the wearer requires him to be in locations subject to high wind, or in other locations where considerable quantities of dust, oil, and other materials may be present in the air. The helmets themselves do not protect the eyes of the wearer from such materials. Furthermore, such safety helmets provide no shock protection for the eyes, although in some instances the wearer may be subject to an impact in the region of the eyes, for example, a sudden blow in the face such as may be received by a pilot making too sudden a turn or dive, or in case of accident. It is, therefore, desired to provide a shield structure which will protect the eyes of a person wearing such a safety helmet.

If a person wearing such a safety helmet tries to put on a conventional pair of goggles, he is confronted with problems arising from physical interference between the goggles and the helmet structure with its supporting rigging.

It is therefore an object of the present invention to provide a shield which may be mounted on and supported by a safety helmet, and which extends in front of the wearer's eyes so as to protect them from impacts and from the entrance of foreign materials.

Another object is to provide a shield of the type described with a frame having an upper portion adapted to conform to the rim of the helmet and a lower portion adapted to conform to the face, so as to minimize the possibility of the entrance of foreign materials into the space behind the shield. In this connection, it is a further object to provide a shield which is adaptable to helmets of different sizes and to faces of various contours with the same or different helmet sizes.

Another object is to provide a shield frame of the type described having portions sufficiently flexible to conform closely to the peripheries of lenses or windows of different sizes, without substantially stressing said windows. A further object is to provide such a flexible frame which may be used with windows stiffer than the frame.

Another object is to provide an improved shield structure including a flexible upper frame portion having an unstressed contour generally conforming to the curvature of a helmet brim and deformable under the stress provided by attaching structures to accommodate variations in that curvature such as are encountered in helmets of different sizes.

Another object is to provide shield structure including a lower frame portion substantially more flexible than the upper frame portion, having an unstressed contour generally conforming to the curvature of a face, and deformable by bending or rolling under very slight stress to accommodate variations in that curvature such as are encountered in different individuals.

A further object is to provide, for an eye shield of the type described, such an improved frame structure which is adapted to conform to a helmet brim, to the wearer's face, and to the contour of the window or lens encircled by the frame.

Another object is to provide improved means for releasably connecting the frame and the window.

Another object is to provide improved means for ventilating the space between the shield and the wearer's face, so as to inhibit condensation on the inside of the shield.

Another object is to provide an eye shield including improved means for attaching an auxiliary lens to the front of the shield.

A further object is to provide an eye shield including improved fastening structures for attaching it to a safety helmet.

The foregoing and other objects of the invention are attained by providing a shield having a one-piece frame of molded flexible plastic material, preferably rubber, either natural rubber or one of the many synthetic types. The upper portion of this frame is contoured to fit against the brim or the marginal portions of a safety helmet. The lower portion of the frame is made considerably more flexible, and is intended to engage the face of the wearer lightly and yieldably. The frame includes a flange projecting inwardly, i.e., toward the face of the wearer, and extending throughout the periphery of the frame. The portion of this flange on the upper part of the frame is adapted to abut against the brim or margin of the safety helmet, and does not engage the face of the wearer. The portion of the flange on the lower side of the frame is considerably thinner and more flexible than the upper flange and is adapted to resiliently engage the wearer's face. The lower flange may be trimmed away to suit the individual wearer, trim marks being provided to facilitate this operation.

The frame is intended to encircle a single, one-piece window or lens, which extends in front of both eyes of the wearer. Since the frame is of flexible material, any given frame can be supplied with windows of varying width (width being measured from top to bottom). The frame is provided with a groove to receive the edges of the window, which is preferably of flexible plastic material.

Several improved mechanisms are disclosed for releasably holding the marginal portions of the lenses and the frame together. The presently preferred mechanism for this purpose consists of spaced lugs projecting outwardly from the margins of the window and received in recesses in the frame. The lugs are made larger at their outer ends than at their bases, and the recesses are correspondingly shaped, so that the window and frame are held firmly together.

The upper part of the frame is provided with vertical grooves in a surface adapted to abut against a vertical surface formed on the edge of the helmet. These grooves communicate with apertures extending completely through the upper flange, so that the space between the shield and the wearer's face is in communication with the outside atmosphere through the narrow passages provided by these grooves and communicating apertures. This space is also in communication with the outside atmosphere through apertures between the ends of the frame and the helmet. These two separated communication means provide ventilation for this interior space.

In one modification of the invention described herein, a pair of snap fastener elements are permanently attached to either end of the shield frame, on its outer side. These snap fastener elements serve two purposes. First, they cooperate with mating snap fastener elements on an auxiliary window so that the auxiliary window may be quickly attached to the shield frame. Second, each one serves as an anchor for a side strap. A plate, held in place by the snap fastener elements, is apertured to receive a loop formed on a link attached to an elastic band of adjustable length. The link and the band form the side strap. The other end of the strap is provided with a snap fastener for attachment to the safety helmet.

The length adjusting mechanism of the connecting elastic bands may include a novel quick-acting adjustment device disclosed herein, so that substantial adjustments may be made quickly in the lengths of the bands.

In another modification of the invention described herein there is molded into the rubber at each end of the shield a cleat-like wire staple, to which is fastened, as by sewing, a loop on the end of an elastic band of adjustable length. The other end of this band is provided with a snap fastener for attachment to the safety helmet.

The foregoing and other objects and advantages of the invention will become apparent from a consideration of the following specification taken together with the accompanying drawings.

Figure 19:
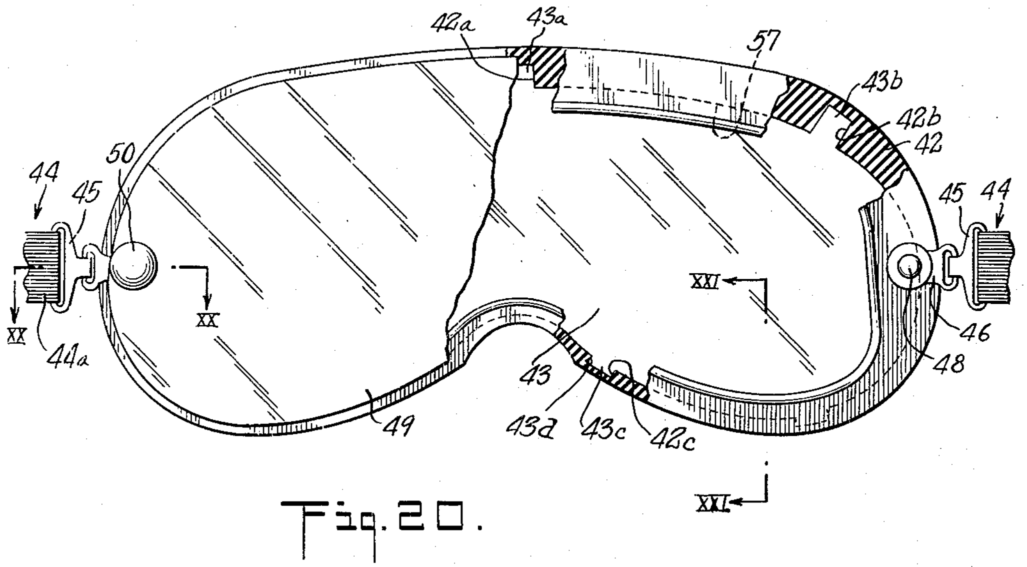
Figures 20, 21, 22:
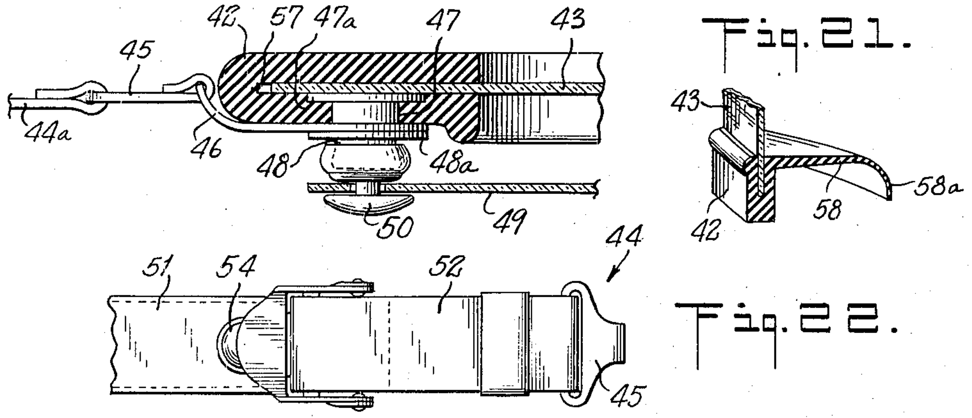
Figure 23:
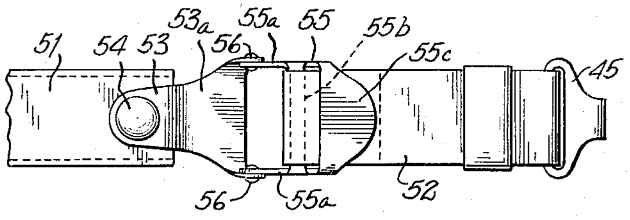
Figure 24:
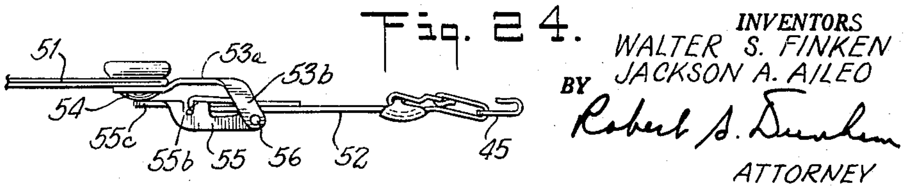

Figs. 10 to 18 each show an alternative mechanism for releasably attaching a window and frame;

Fig. 19 is a front elevational view of a modified form of eye shield embodying the invention with certain parts broken away and other parts shown in section;

Fig. 20 is a fragmentary sectional view taken on the line XX—XX of Fig. 19;

Fig. 21 is a fragmentary sectional view taken on the line XXI—XXI of Fig. 19;

Fig. 22 is an elevational view of one of the side straps of Fig. 19, showing the length adjusting mechanism in its shortened position;

Fig. 23 is a view similar to Fig. 22, showing the length adjusting mechanism in its lengthened position; and Fig. 24 is a plan view taken of the strap as shown in Fig. 22.

*Figs. 1 to 7*

Referring to the drawings, there is shown a shield generally indicated by the reference numeral 1 and including a frame 2 having an upper portion 2*a*, a lower portion 2*b* and end portions 2*c* connecting the upper and lower portions. The frame 2 is of flexible molded plastic material, and is preferably molded in one piece. The preferred material is rubber, which may either be the natural rubber or one of the synthetic varieties.

The upper portion 2*a* of the frame is of the same thickness as the lower portion, but is substantially wider in the vertical direction, and is therefore less flexible, although it nevertheless has substantial flexibility. Furthermore, although the frame is molded in one piece, the upper portion 2*a* may be, and indeed is preferably formed from rubber stock which is of a substantially stiffer grade than that from which the lower portion 2*b* is formed.

The frame is provided with an inwardly facing groove identified as 3*a* in the upper portion 2*a* of the frame and as 3*b* in the lower portion 2*b*. This groove is adapted to receive the marginal portion of a window or lens 4. The window is preferably formed of a flexible plastic material, for example, cellulose acetate. The window is preformed to conform to the general curvature of the face. It is made of material substantially stiffer than the lower frame portion 2*a* and may even be somewhat stiffer than the upper frame portion 2*a*.

The inside of the frame 2, i.e., the side toward the wearer's face, is provided with a projecting flange identified as 5*a* on the upper portion of the frame and as 5*b* on the lower portion. The lower portion 5*b* of the flange is made thinner and wider than the upper portion 5*a*, so as to conform yieldably to the contour of the wearer's face. Like the lower portion 2*b* of the frame, the lower flange 5*b* is preferably formed of a more flexible grade of rubber than the upper flange.

Figures 3, 6, 7:
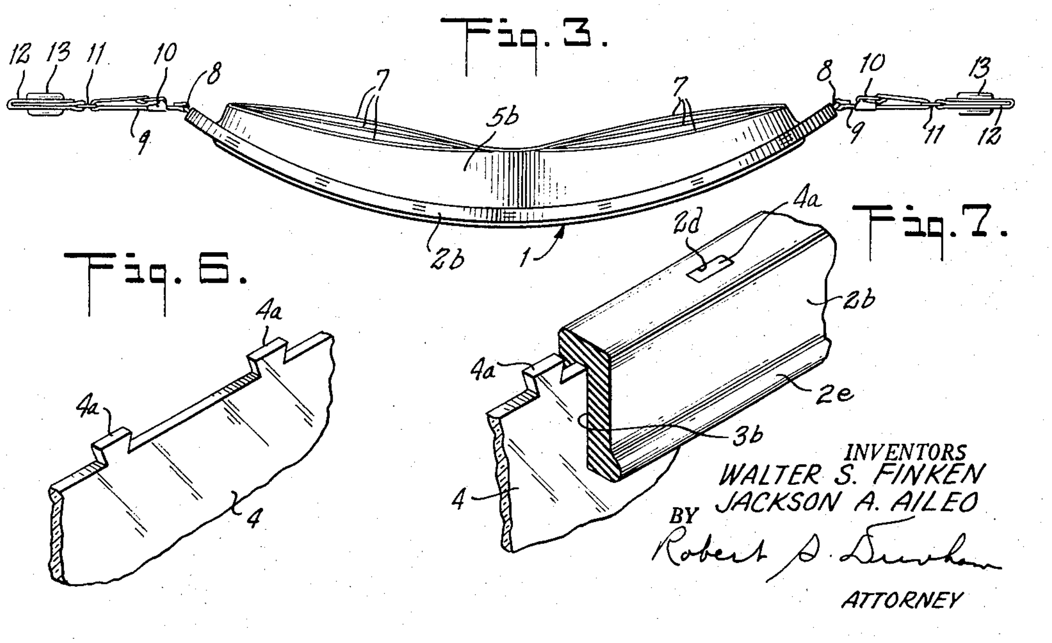
Fig. 3 is a bottom plan view of the shield of Figs. 1 and 2.
Fig. 6 is a fragmentary perspective view, on an enlarged scale, showing the lugs formed on the edge of the window for attachment of the frame.
Fig. 7 is a view, similar to Fig. 6, but additionally showing a fragment of the frame cooperating with the lugs.

The edges of the window 4 are provided with spaced projecting lugs 4*a*, best seen in Figs. 6 and 7. These lugs are wider at their tips than at their bases, and are received in correspondingly shaped apertures 2*d* formed in the frame 2. These apertures 2*d* may open all the way through the frame, or they may be closed at their outer ends, or some may be open and some closed, as shown. The contours of the lugs and apertures are such that the lugs may readily be inserted in the apertures by deforming the flexible frame material. When so inserted, the apertures grip the lugs firmly and hold the window and frame together. While the window and frame can be readily separated, by again deforming the frame material, it is practically impossible for them to be accidentally separated.

The frame structure shown and described is adapted to be used with windows of different sizes. The position of the upper window edge is determined by the upper frame portion 2*a*. The bottom frame portion 2*b* assumes a position along the bottom edge of whatever window is attached to the frame. Both the frame and the window are sufficiently flexible so that their upper edges conform to the front portion of the helmet, without substantial stress.

The extreme inner portions of the lower flange 5*b* are provided with molded trim lines 7 (see Fig. 3), to facilitate and guide the trimming of this portion of the frame which may be required to increase the comfort of the wearer. The frame 2 is provided with a bead 2*e* around the outside of the window opening, to strengthen that part of the frame against localized tearing stresses.

Molded in each end of the frame are wire staples 8 having central loop portions projecting from the frame 2. A band 9 of flexible elastic fabric material is threaded through each of the loops 8. The other end of the band 9 is formed into a loop of adjustable length by means of a conventional slider 10. This adjustable loop is connected through a link 11 to a tab 12 carrying a snap fastener 13 which cooperates with a similar snap fastener on a safety helmet 15.

Figures 4, 5, 8, 9, 18:
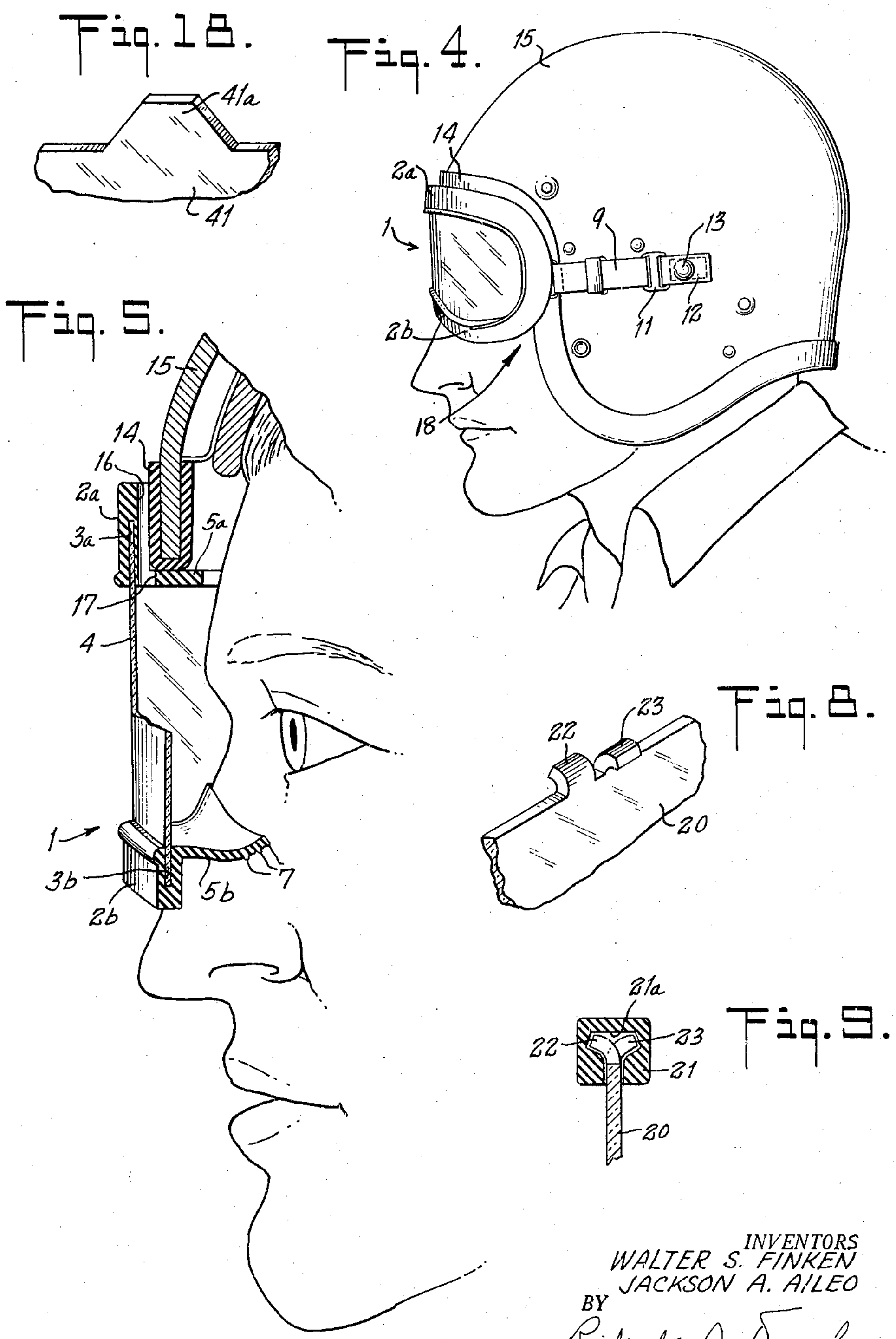
Fig. 4 is a side elevational view, showing the shield mounted on a safety helmet and being worn by a person.
Fig. 5 is a view similar to Fig. 4, but on an enlarged scale and showing the shield in section on the line V—V of Fig. 1.
Figs. 8 and 9 are views similar to Figs. 6 and 7, showing another mechanism for releasably attaching the window and frame.

Figs. 4 and 5 show the novel goggle structure mounted on a helmet 15 being worn by a person. It may there be seen that the vertical surface on the inside of the upper portion 2*a* of the frame abuts against a vertical surface on a rubber cushion 14 which extends along the edge of the helmet 15. The generally horizontal surface on the upper side of the upper flange 5*a* abuts against the horizontal surface on the lower edge of the cushion 14. The elastic straps 9 and their related parts hold the shield 1 fixed in position with respect to the safety helmet 15, with the frame portion 2*a* and the upper flange 5*a* in firm abutting engagement with the cushion 14, as shown. The frame portion 2*a* and the flange 5*a* are sufficiently flexible so that they may be deformed into the required firm abutting engagement by the straps 9. The straps 9 may be made strong enough to apply a substantial deforming force to the frame portion 2*a* and flange 5*a*. No discomfort to the wearer can arise from high or unevenly localized pressures between these parts and the cushion 14.

The lower frame portion 2*b* and the lower flange 5*b* are made sufficiently flexible so that they have very little tendency to hold their shape, but deform easily. Hence, the location of the lower frame portion 2*b* is determined by: (1) the location of the upper frame portion 2*a*, which is fixed in position with respect to the helmet as described above; and (2) the dimensions and contour of the window 4, which is relatively stiff as compared to the lower frame portion 2*b*.

The location of the flange 5*b*, and particularly the inner edge thereof, is determined by the location of the lower frame portion 2*b*, as set forth above. The flange 5*b* is the only portion of the shield which engages the face, and, since it is of thin, flexible material, it readily rolls or bends and thereby conforms to the contour of the face without causing discomfort to the wearer. The shield is therefore usable with faces of various contours. If any discomfort is noted, it may be readily overcome by trimming the flange 5*b* along the trim lines 7.

It may be seen that the shield is not supported by the bridge of the nose or any other part of the wearer's face, but is supported on the helmet 15.

Figure 1:
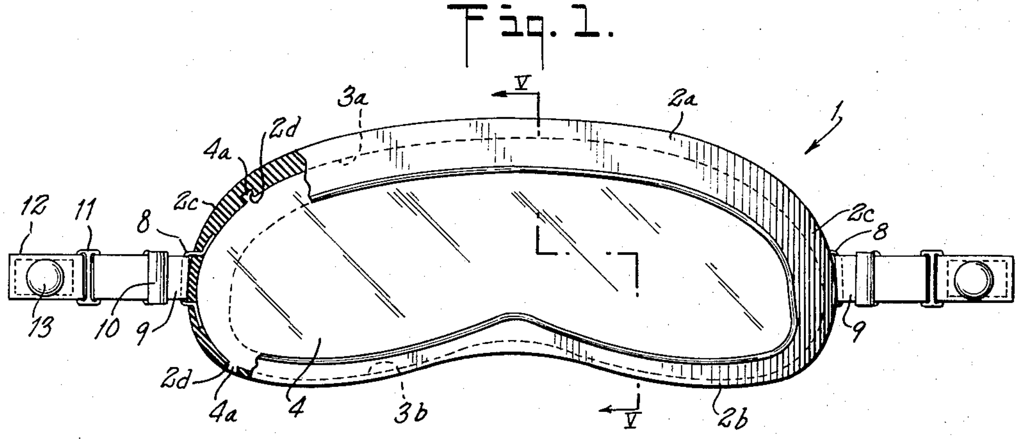
Fig. 1 is a front elevational view of an eye shield embodying the invention.
Figure 2:
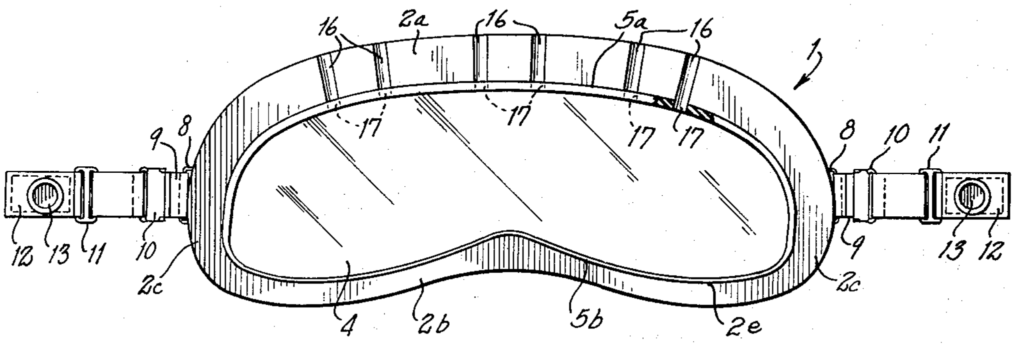
Fig. 2 is a rear elevational view of the shield of Fig. 1.

On the inner surfaces of the upper frame portion 2*a*, there are provided a plurality of vertical grooves 16 (see Figs. 2 and 5). These grooves 16 communicate with holes 17 which extend completely through the upper flange 5*a*. The grooves 16 and 17 provide ventilation in the space between the shield and the wearer's face so that condensation on the inside of window 4 is minimized. Since the ventilating apertures are made in the upper part of the frame structure, any heated air inside the shield tends to rise and pass out into the atmosphere, being replaced by air entering at the lower back corners where the shield frame spans the space between the helmet 15 and the head. Since the helmet shell is spaced from the head at all points, apertures 18 between the frame and the helmet shell must necessarily be left at these corners. However, these apertures are shielded or baffled by the frame and by the shell so that substantially no foreign material can enter there.

The upper groove 3*a* is deeper than the lower groove 3*b*. The upper marginal portion of the window 4 fits into the groove 3*a*. The window 4 is sufficiently stiff so that its position is substantially fixed by the engagement of its upper marginal portion in the groove of frame member 2*a*, when the latter is held firmly in place on the edge of the helmet shell by the bands 9. The helmet shell extends generally parallel to and spaced from the wearer's face, and the position of the lower edge of the window 4 is thereby established in a position spaced from the face of the wearer. The lower portion 3*b* of the frame conforms to this established contour of the lower edge of the window, since it is substantially more flexible than the window. The lower flange portion 5*b* then engages the face lightly, with only the force required to deform this thin light flange as necessary to conform to the contour of the face. No stress is transmitted to the face either due to the weight of the shield structure or due to the tension in the supporting bands 9.

*Figs. 8 and 9*

These figures illustrate a modified form of fastening means for connecting a window 20 to a frame member

21. The window 20 has pairs of projections 22, 23 spaced about its periphery, only one of the pairs being shown in the drawing. The projections 22 and 23 are preformed by bending in opposite directions. The frame member 21 has a recess 21*a* contoured to receive a pair of projections 22 and 23.

It will be readily seen that the window 20 may be inserted in the frame 21 by deforming the flexible material of the frame so that the pair of projections 22, 23 can be slipped into the aperture 21*a*.

Figure 10:
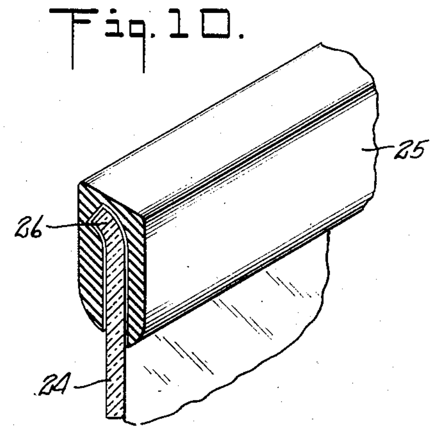

*Fig. 10*

This figure shows a window 24 attached to a frame member 25 by means of a single projection 26 which is bent over in one direction. The structure shown in Fig. 10 is the equivalent of one-half of the pair of projections 22 and 23 of Fig. 9.

Figure 11:
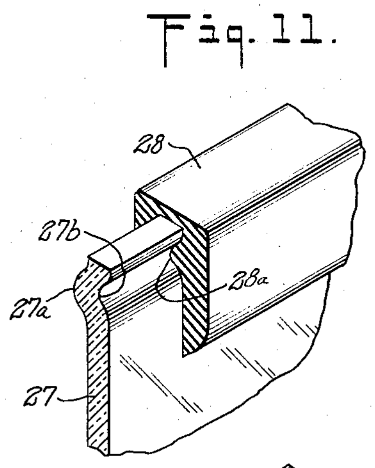

*Fig. 11*

In this figure there is shown a window 27 having a peripheral ridge 27*a* formed in one lateral face and a peripheral groove 27*b* formed in the opposite lateral face. The window 27 is received in a frame member 28 having a groove 28*a* contoured to correspond with the ridge 27*a* and the groove 27*b*.

Figure 12:
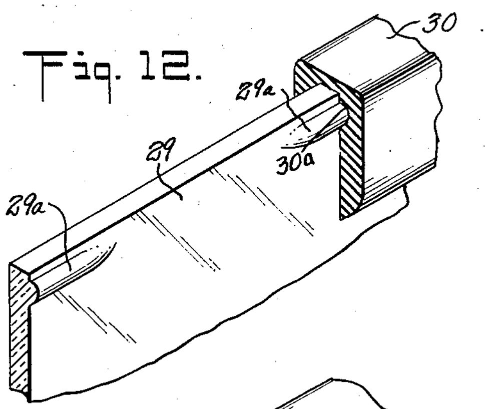

*Fig. 12*

This figure illustrates a window 29 attached to a flexible frame member 30. The window 29 has a plurality of ridges 29*a* extending peripherally along its margin, but spaced apart. The frame member 30 has a correspondingly contoured groove 30*a*.

Figure 13:
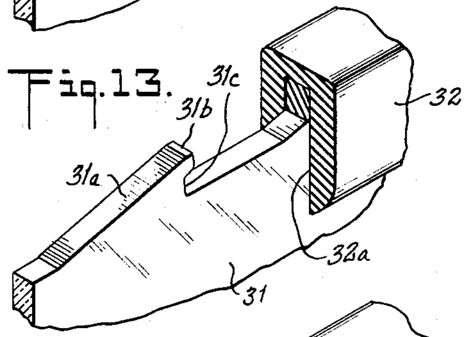

*Fig. 13*

In this figure a window 31 has a series of peripherally spaced teeth 31*a* having a tip portion 31*b* which overhangs a neck portion 31*c* at the base of the tooth on one side only. The window member 31 is received in a frame member 32 having a correspondingly contoured groove 32*a*.

Figure 14:
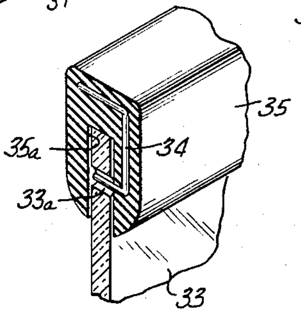

*Fig. 14*

This figure illustrates a window 33 having a series of spaced holes 33*a* around its periphery. A corresponding series of pins 34, which may be formed of wire, are molded into the flexible frame member 35. When the window 33 is inserted in the frame member 35, the frame member is deformed so that the edge of the window passes the end of pin 34. After the window 33 has reached the bottom of the groove 35*a*, the deformed portion of the frame member 35 is released, allowing the pin 34 to project through the aperture 33*a* and hold the window 33 securely in place.

Figure 15:
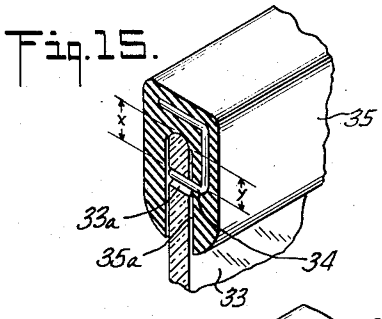

*Fig. 15*

This figure illustrates a modification of the structure shown in Fig. 14. In this figure, parts which correspond to their counterparts in Fig. 14 have been given the same reference numerals.

The principal difference between the structure shown in this figure and that in Fig. 14 is in the dimensional relationships. The distance between the outer edge of the hole 33*a* in window 33 and the outer periphery of that window is illustrtated by the reference character X in the drawing. The distance between the bottom of the groove 35*a* and the nearest side of the projecting end of pin 34, when frame 35 is unstressed, is illustrated by the character Y in the drawing. If the distance X is made larger than the distance Y, then when the window is in place in the frame member 35, with the pin 34 projecting through aperture 33*a*, the pin 34 is deflected from its unstressed position, and is held tightly against the outer edge of the hole 33*a*, and correspondingly holds the rim of the window 33 tightly against the bottom of the groove 35*a*.

Figure 16:
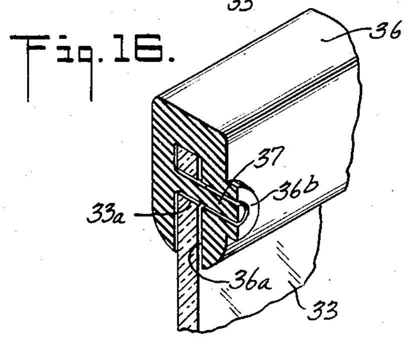

*Fig. 16*

This figure shows a window 33 corresponding exactly to the window 33 of Figs. 14 and 15, having a series of spaced apertures 33*a*. In Fig. 16, the window 33 is received in a frame member 36, which has a series of integrally molded pins 37 formed in one side of a groove 36*a* in the frame member. These pins 37 are adapted to project through the holes 33*a* and through the cooperating aligned holes 36*b* in the opposite side of the frame member 36. The frame member 36 in this modification may be molded in two parts which are then vulcanized or otherwise connected together.

Figure 17:
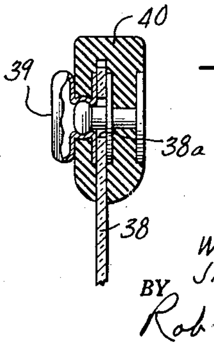

*Fig. 17*

This figure illustrates a window 38 provided with apertures 38*a*, adapted to receive one member of a conventional snap fastener 39, one part of which is molded in one side of a frame member 40 and the other part in the opposite side of frame member 40.

It will be recognized that any of the fastening structures shown in Figs. 6 to 17 may be employed to hold a window releasably within a frame member. The structure shown in Figs. 6 and 7 is preferred, since it is substantially simpler and less expensive to construct than any of the others, and since it allows a smoother and more attractive external appearance of the complete eye shield.

*Fig. 18*

This figure shows a window 41 having a tooth or lug 41*a*, corresponding generally to the lugs 4*a* of Fig. 6. The tooth 41*a* differs from the lugs 4*a* in that its tip is narrower than its base. The tooth 41*a* may be described as having the form of a frustum of a pyramid.

When a window having teeth such as that shown at 41*a* is used, it is preferred to make the recesses in the frame slightly smaller than the teeth 41*a*, so that when the window is inserted in the frame, the recesses grip the teeth tightly. It will be readily understood that a window having teeth formed like the tooth 41*a* may be inserted in its associated frame much more quickly than some of the other forms of teeth described herein.

*Figs. 19 to 21*

These figures illustrate a modified form of eye shield including a frame 42 having a slot 57 to receive the periphery of a window 43. The window 43 is provided with spaced projections 43*a*, 43*b* and 43*c*, which extend into corresponding recesses 42*a*, 42*b* and 42*c*, formed in the bottom of the slot 57. The projections 43*a* and 43*b* are located on the upper side of the window 43 and are generally similar in contour to the projections 41*a* illustrated in Fig. 18. As in the case of the frame 2 of Fig. 1, the upper side of the frame 42 is heavier than the lower side and is capable of retaining its preformed shape. The upper edge of the window 43 is adequately held in engagement with the upper side of the frame 42 by a close fit of the recesses 42*a* and 42*b* with the large projections 43*a* and 43*b*.

The lower side of the frame 42 is lighter and more flexible, and is unable to retain its preformed contour against external forces, such as the force of gravity, for example. The side nearest the wearer's nose of each of the projections 43*c* on the lower edge of the window 43 is therefore made with an overhang, as shown at 43*d*. The recess 42*c* in the frame is similarly shaped, so that when the frame and window are assembled, the overhang on the projections 43*c* holds the lower edge of the frame tightly against the periphery of the window.

As shown in Fig. 21, the lower edge of the frame 42 has a face engaging flange 58 somewhat different from the flange 5*b* of Fig. 5. Flange 58 has a rolled edge portion 58*a* adapted to bend easily and thereby flexibly and closely engage faces of different contours.

The eye shield of Fig. 19 also includes improved means for attaching the side straps, which are indicated generally at 44. Each elastic band 44*a* of a side strap 44 terminates in a loop which extends through an aperture in a link 45, whose opposite end extends through an aperture formed in a plate 46. The opposite end of plate 46 is apertured to receive a mounting post 47 having a flange 47*a* and serving as a support for a snap connector element 48, having a flange 48*a*. The mounting post 47, as best seen in Fig. 20, is received in a correspondingly shaped recess formed in the front wall of the groove 57. After the mounting post 47 is in place, the end of plate 46 is placed over it, and then the snap connector element 48 is placed over the end of the post, being attached thereto in any suitable conventional manner. The plate 46 is then held in place between flange 48*a* and the front surface of the frame 42.

The snap connector element 48 also serves as a support for an auxiliary window 49 having a contour generally similar to that of the frame 42 and provided at its opposite ends with snap connector elements 50 which mate with the snap connector elements 48 mounted on the frame 42. Such an auxiliary window may be of colored or other light reducing material for use in bright sunlight, for example, and is quickly removable under other weather conditions, or in darkness, by means of the snap connectors 48, 50. The snap connector elements have sufficient thickness to ensure adequate ventilation of the space between window 43 and auxiliary window 49.

*Figs. 22 to 24*

These figures illustrate a side strap construction, which may be the side strap 44 of Fig. 19 and which may replace the side strap 9 of Figs. 1 to 4. This side strap construction includes mechanism for making a rapid change of length of the side strap. It is particularly intended for use when the wearer of the safety helmet desires to take the eye shield away from in front of his eyes and move it upwardly to the top of the helmet. In the latter position, the eye shield is somewhat closer to the connectors attached to the helmet, to which the side straps are connected, and a shortening of the length of the side straps is therefore desirable in order to hold the eye shield firmly in place on the helmet. Figs. 22 and 24 show the strap structure in its shortened condition, while Fig. 23 shows the strap in its lengthened condition.

The strap member 44 includes two pieces 51 and 52 of flexible material. A plate member 53 is attached to one of these pieces of material, for example by a suitable rivet or eyelet 54. The plate member 53 has an offset extension 53*a* which lies substantially in the same plane as the flexible material 51. At the end of the extension 53 there are provided a pair of lugs 53*b*, projecting at right angles from the extension 53*a* in the direction of and beyond the plane of plate 53 where it is attached to the flexible material 51. Pivotally mounted on the lugs 53*b* is a frame 55 including a pair of side arms 55*a* supported on pivot pins 56 extending through the lugs 53*b*. The frame 55 also includes a cross piece 55*b* around which is fastened a loop formed on the end of the flexible material piece 52. Another cross piece 55*c* at the end of the frame 55 farthest from the pivot provides a convenient thumb piece by which the frame 55 may be rotated through 180° from the position shown in Fig. 22 to that of Fig. 23, or vice versa, so as to lengthen or shorten the strap 44 as may be required.

As best seen in Fig. 24, the cross piece 55*b* when the strap is in the shortened position is so located that the line of the flexible strap piece 52 lies inside the pivot axis, so that lengthwise forces acting on the strap pieces 51 and 52 cannot dislodge the frame member 55 from the position illustrated. Strap piece 52 need not necessarily be inside the pivot axis, but may be aligned with it, without changing the operation of the device.

While we have shown and described certain preferred embodiments of our invention, other modifications thereof will readily occur to those skilled in the art and we therefore intend our invention to be limited only by the appended claims.

We claim:

1. Head and eye protective apparatus, comprising a helmet including a rigid shell having a front rim adapted to extend across but be spaced in front of the wearer's forehead, an eye shield supported on said helmet shell, said eye shield comprising a frame of flexible material defining a window opening and including an upper portion having its rear side abutting the front rim of the helmet, a lower portion and end portions connecting said upper and lower portions, flange means projecting rearwardly from the rear side of said frame member and including an upper flange portion projecting from the upper frame portion below the upper edge thereof and having its upper surface abutting the front rim of the safety helmet, and a lower flange portion projecting from the lower portion of the frame, said lower frame and flange portions being more flexible than the upper portion of the frame and its corresponding flange portion, so that said lower flange portion is adapted when held in abutting relation with a face to conform yieldably to the facial contour, and tensionable supporting means attached to the end portions of the frame member and detachably connected to the helmet, and effective to hold the rear side of said upper frame portion and the upper surface of the upper flange portion in firm engagement with the helmet shell without stressing substantially said lower frame portion and flange.

2. Head and eye protective apparatus as defined in claim 1, in which said lower flange portion has a rolled inner edge flaring downwardly from said lower frame portion and adapted to bend easily and thereby to engage flexibly and closely faces of different contours.

3. Head and eye protective apparatus, comprising a helmet including a rigid shell having a front rim adapted to extend across but be spaced in front of the wearer's forehead, an eye shield supported on said helmet shell, said eye shield comprising a frame of flexible material defining a window opening and including an upper portion abutting the front rim of the helmet, a lower portion and end portions connecting said upper and lower portions, said lower portion being more flexible than said upper portion, a flange adapted to project toward the wearer's face from said lower frame portion, said flange having a rolled inner edge flaring downwardly from said lower frame portion and adapted to bend easily and thereby to engage flexibly and closely faces of different contours, and tensionable supporting means attached to the end portions of the frame member and detachably connected to the helmet, said supporting means being effective to hold said upper frame portion in firm engagement with the helmet shell without stressing substantially said lower frame portion and flange, said upper frame portion being maintained spaced from the face of the wearer by the helmet shell and said lower frame portion being maintained spaced from the face of the wearer by said flange.

4. An eye shield to be worn with a rigid safety helmet having a front rim adapted to extend across and to be spaced in front of the wearer's forehead, comprising a frame of flexible material defining a window opening, said frame including an upper portion having its rear side adapted to abut against the front rim of the helmet, a lower portion, and end portions connecting said upper and lower portions, said lower portion being more flexible than said upper portion, flange means projecting rearwardly from the rear side of said frame member and including an upper flange portion projecting from the upper frame portion below the upper edge thereof and having its upper surface adapted to abut the front rim of the safety helmet along its lower periphery and a lower flange portion projecting from the lower frame portion and more flexible than the upper flange portion so that said lower flange portion is adapted when held in abutting relation with a face to conform yieldably to the facial contour, and tensionable supporting means attached to the end portions of the frame member and adapted for attachment to the helmet, said supporting means being effective when attached to the helmet to hold the rear side of said upper frame portion and the upper surface of said upper flange portion in firm engagement with the helmet without stressing substantially said lower frame portion and flange.

5. A frame as defined in claim 4 in which said frame comprises a single integral frame member molded in one piece from a relatively stiff material in said upper portion and a relatively flexible material in said lower portion.

6. An eye shield comprising a continuous frame member of resilient flexible, compressible material defining a window opening, a window member in said window opening and completely enclosed thereby, said window member having a plurality of tapering projections formed integrally on its periphery which are relatively short as compared to the distance between said projections, said projections being narrower at their tips than at their bases, said frame having a plurality of tapering recesses therein having unstressed dimensions slightly smaller than said projections, said recesses receiving said projections, the frame material adjacent the recesses being compressed by said projections so as to grip the projections tightly, said tapering projections and recesses facilitating attachment and detachment of the window and frame members.

References Cited in the file of this patent

UNITED STATES PATENTS

| | | |
|---|---|---|
| 696,574 | Laros | Apr. 1, 1902 |
| 1,306,357 | Shindel | June 10, 1919 |
| 2,387,849 | Lehmberg et al. | Oct. 30, 1945 |
| 2,387,851 | Lown et al. | Oct. 30, 1945 |
| 2,427,918 | Malcom et al. | Sept. 23, 1947 |
| 2,555,578 | Davis | June 5, 1951 |
| 2,625,685 | Moeller | Jan. 20, 1953 |
| 2,706,815 | Parmelee | Apr. 26, 1955 |

FOREIGN PATENTS

| | | |
|---|---|---|
| 108,478 | Switzerland | Jan. 16, 1925 |
| 847,458 | France | July 3, 1939 |